(12) United States Patent
Kubotani et al.

(10) Patent No.: US 10,303,947 B2
(45) Date of Patent: May 28, 2019

(54) INFORMATION PROCESSING APPARATUS AND INFORMATION PROCESSING METHOD

(71) Applicant: Panasonic Intellectual Property Management Co., Ltd., Osaka (JP)

(72) Inventors: Hiroyuki Kubotani, Hyogo (JP); Mitsuhiro Aso, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/845,093

(22) Filed: Dec. 18, 2017

(65) Prior Publication Data

US 2018/0218219 A1    Aug. 2, 2018

(30) Foreign Application Priority Data

Jan. 27, 2017 (JP) ................................ 2017-013460
Jul. 27, 2017 (JP) ................................ 2017-145718

(51) Int. Cl.
*G06K 9/00* (2006.01)
*G06F 17/30* (2006.01)
(Continued)

(52) U.S. Cl.
CPC ............ *G06K 9/00671* (2013.01); *A23L 5/00* (2016.08); *G01B 11/24* (2013.01); *G06F 16/00* (2019.01);
(Continued)

(58) Field of Classification Search
None
See application file for complete search history.

(56) References Cited

U.S. PATENT DOCUMENTS

| 8,829,365 B1* | 9/2014 | Wallace | G06F 13/382 |
| | | | 177/25.13 |
| 2009/0179734 A1* | 7/2009 | Do | G06F 17/30879 |
| | | | 340/5.8 |

(Continued)

FOREIGN PATENT DOCUMENTS

JP    2010-191745    9/2010

OTHER PUBLICATIONS

Extended European Search Report, dated May 14, 2018, from the European Patent Office (EPO) for the related European Patent Application No. 18153194.8.

*Primary Examiner* — Chico A Foxx
(74) *Attorney, Agent, or Firm* — Greenblum & Bernstein, P.L.C.

(57) ABSTRACT

An information processing apparatus includes a first-information acquirer, a second-information acquirer, a judger, and a presentation controller. The first-information acquirer acquires first information indicating a type of an ingredient provided for preparation and an amount of the ingredient. The second-information acquirer acquires second information indicating an amount that is needed for an ingredient of the type in a recipe. The judger judges a magnitude relationship between the amount indicated by the first information and the amount indicated by the second information. The presentation controller causes a presenter to present third information indicating, in accordance with the judged magnitude relationship, the amount indicated by the second information versus the amount indicated by the first information.

10 Claims, 6 Drawing Sheets

(51) Int. Cl.
*G06F 16/00* (2019.01)
*G01B 11/24* (2006.01)
*A23L 5/00* (2016.01)
G06F 3/01 (2006.01)
G06F 3/16 (2006.01)

(52) U.S. Cl.
CPC ............... *G06F 3/01* (2013.01); *G06F 3/16* (2013.01); *G06T 2207/10004* (2013.01)

(56) References Cited

U.S. PATENT DOCUMENTS

| | | | | |
|---|---|---|---|---|
| 2011/0055027 | A1* | 3/2011 | Suzuki | G06Q 10/00 705/15 |
| 2013/0149675 | A1* | 6/2013 | Slone | G09B 19/00 434/127 |
| 2013/0171304 | A1* | 7/2013 | Huntley | G06Q 50/00 426/231 |
| 2013/0335418 | A1 | 12/2013 | Kim et al. | |
| 2014/0204401 | A1* | 7/2014 | Salerno | B41J 3/4075 358/1.6 |
| 2014/0334691 | A1* | 11/2014 | Cho | G06Q 30/0631 382/110 |
| 2014/0356492 | A1* | 12/2014 | Merea | G01G 19/414 426/231 |
| 2015/0120705 | A1* | 4/2015 | Osaki | G06F 17/30864 707/722 |
| 2016/0005329 | A1 | 1/2016 | Sako et al. | |
| 2018/0285626 | A1* | 10/2018 | Aso | G01B 11/25 |

\* cited by examiner

INFORMATION PROCESSING APPARATUS AND INFORMATION PROCESSING METHOD

BACKGROUND

1. Technical Field

The present disclosure relates to an information processing apparatus and an information processing method.

2. Description of the Related Art

A technology by which an image indicating how to cut an ingredient placed on a worktop is displayed and superposed on the ingredient has been disclosed in a method for assisting in cutting an ingredient provided for preparation in the related art. By the technology, the type of ingredient is identified by taking an image of the ingredient placed on the worktop, and the image indicating how to cut the ingredient is displayed in accordance with a preparation method determined based on a recipe (for example, Japanese Unexamined Patent Application Publication No. 2010-191745).

SUMMARY

In one general aspect, the techniques disclosed here feature an information processing apparatus including a first-information acquirer, a second-information acquirer, a judger, and a presentation controller. The first-information acquirer acquires first information indicating a type of an ingredient provided for preparation and an amount of the ingredient. The second-information acquirer acquires second information indicating an amount that is needed for an ingredient of the type in a recipe. The judger judges a magnitude relationship between the amount indicated by the first information and the amount indicated by the second information. The presentation controller causes a presenter to present third information indicating, in accordance with the judged magnitude relationship, the amount indicated by the second information versus the amount indicated by the first information.

Note that the general or specific aspects may be implemented as a system, an apparatus, a method, a recording medium, a computer program, or a combination of any of the system, the apparatus, the method, the recording medium, and the computer program.

The information processing apparatus and the information processing method according to the disclosure enable effort by a cook to be reduced.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
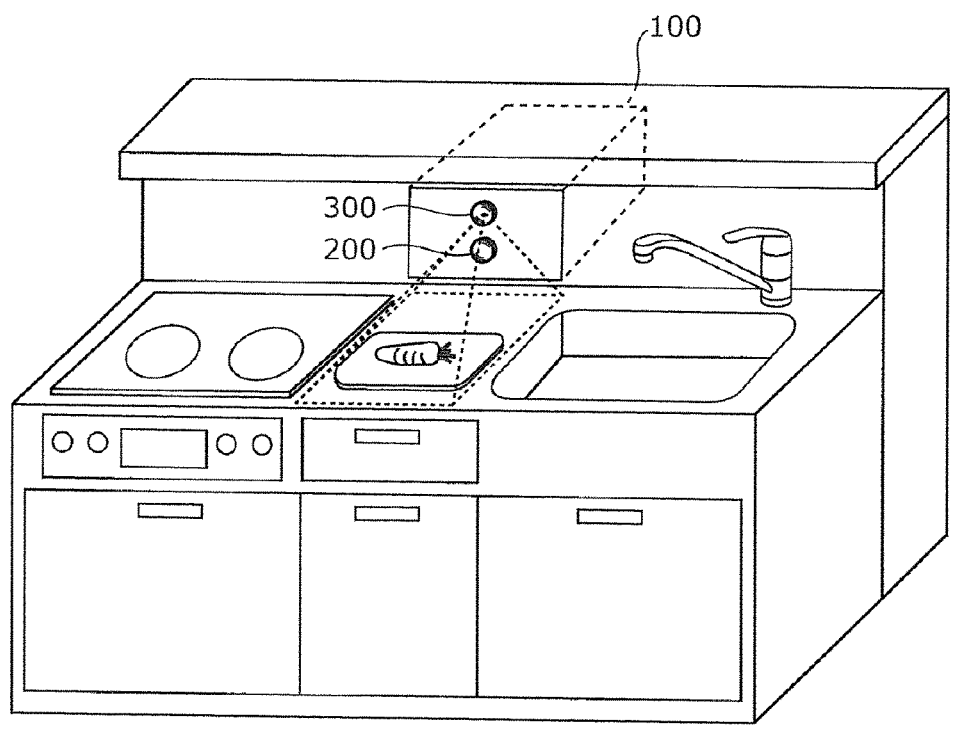
FIG. 1 is a diagram illustrating an outline of an information processing apparatus in this embodiment.

Underlying Knowledge Forming Basis of the Present Disclosure

Generally, to enhance the reproducibility of a recipe, the accuracy of amounts of ingredients provided for preparation and seasonings needs to be enhanced. Since ingredients even of the same type normally have different sizes, a cook considers the amount of an ingredient specified by the recipe and the amount of an ingredient actually provided for preparation and controls an amount for preparation of the ingredient. For example, suppose a case where the type of ingredient is identified as carrot. If the amount of a carrot specified in the recipe is one medium-size carrot, and if the amount of a carrot actually provided for preparation is one large-size carrot, the cook needs to control the amount of the large-size carrot based on the amount of the medium-size carrot by themselves and then cut the carrot. An amount (size) of an ingredient is not considered in preparation assistance methods in the related art, and the cook needs to determine an amount for preparation of the ingredient, and this is laborious.

As described above, a technical solution for reducing effort by the cook to consider an amount (size) for preparation of an ingredient and to control the amount of the ingredient has not been studied in the related art such as the technique in Japanese Unexamined Patent Application Publication No. 2010-191745.

One non-limiting and exemplary embodiment in the disclosure provides an information processing apparatus and information processing method that reduces effort by the cook.

To address such an issue, an information processing apparatus includes a first-information acquirer, a second-information acquirer, a judger, and a presentation controller. The first-information acquirer acquires first information indicating a type of an ingredient provided for preparation and an amount of the ingredient. The second-information acquirer acquires second information indicating an amount that is needed for an ingredient of the type in a recipe. The judger judges a magnitude relationship between the amount indicated by the first information and the amount indicated by the second information. The presentation controller causes a presenter to present third information indicating, in accordance with the judged magnitude relationship, the amount indicated by the second information versus the amount indicated by the first information.

The magnitude relationship between the amount needed for the ingredient in the recipe and the amount of the ingredient provided for preparation is thereby judged, and the amount needed for the ingredient in the recipe versus the amount of the actually provided ingredient is presented. Accordingly, even if the amount of the ingredient different from the amount needed for the ingredient in the recipe is provided, the cook does not need to determine an amount for preparation of the actually provided ingredient by themselves, and effort by the cook may be reduced.

In addition, the first-information acquirer may acquire the first information through image capturing performed on the ingredient by a camera.

This enables the type of ingredient and the amount of the ingredient to be easily acquired by using the camera.

Moreover, the presentation controller may cause the presenter to superpose the third information on at least part of one of the provided ingredient, an image based on the provided ingredient, and a utensil on which the provided ingredient is placed.

This enables the cook to perform the preparation while looking at the third information superposed on the provided ingredient or the like and thus enables the preparation accuracy to be enhanced.

Further, the presentation controller may cause the presenter to present the third information outside the provided ingredient.

This enables the cook to recognize the provided ingredient and then to perform the preparation while looking at the third information presented outside the ingredient.

Still further, the third information may further include information indicating an ingredient cutting technique for the provided ingredient. The information is based on the amount needed for the ingredient of the type versus the amount of the provided ingredient.

This enables the cook to perform the preparation while looking at the cutting technique for the provided ingredient or the like, the cutting technique being superposed on the provided ingredient. This thus enables preparation accuracy to be enhanced.

Still further, the presentation controller may cause the presenter to present the second information.

This enables the cook to recognize the amount needed for the ingredient in the recipe and thus to easily recognize a prospective ingredient preparation process.

Still further, the information processing apparatus may include a fourth-information acquirer that acquires fourth information indicating an amount of a prepared part of the provided ingredient. The presentation controller may further cause the presenter to present fifth information indicating progress of the preparation based on the second information and the acquired fourth information.

This enables the cook to simultaneously recognize the amount needed for the ingredient in the recipe and the amount of the part that has been prepared in the ingredient and thus to easily recognize the progress of the ingredient preparation.

Still further, while a difference between the amount indicated by the second information and the amount indicated by the fourth information is equal to or smaller than a predetermined value, the presentation controller may cause the presenter to present information indicating that an end of the preparation is approaching.

This enables the cook to be notified of the approach of the amount of a part that has been prepared in the ingredient to the amount needed for the ingredient in the recipe and thus to easily perform the preparation of the ingredient in accordance with the needed amount.

Still further, if the judger judges that the amount indicated by the first information is larger than the amount indicated by the second information, the presentation controller may cause the presenter to superpose an image indicating the ingredient cutting technique on an area of a size identified based on a difference between the amount indicated by the first information and the amount indicated by the second information. The area is in an area of the provided ingredient. If the judger judges that the amount indicated by the first information is equal to the amount indicated by the second information, the presentation controller may cause the presenter to superpose an image indicating the ingredient cutting technique on a whole area of the provided ingredient. If the judger judges that the amount indicated by the first information is smaller than the amount indicated by the second information, the presentation controller may cause the presenter to superpose an image indicating the ingredient cutting technique on a whole area of the provided ingredient and to present information indicating ingredient shortage outside the provided ingredient.

The image indicating the ingredient cutting technique and generated in accordance with the magnitude relationship between the amount needed for the ingredient in the recipe and the amount of the provided ingredient are thereby superposed on the provided ingredient. Accordingly, simply cutting the ingredient in accordance with the superposed image enables the cook to easily provide the amount needed for the ingredient in the recipe.

Still further, an information processing method includes: acquiring first information indicating a type of an ingredient provided for preparation and an amount of the ingredient; acquiring second information indicating an amount that is needed for an ingredient of the type in a recipe; judging a magnitude relationship between the amount indicated by the first information and the amount indicated by the second information; and controlling presentation, the controlling causing third information to be presented, the third information indicating, in accordance with the judged magnitude relationship, the amount indicated by the second information versus the amount indicated by the first information.

This enables provision of the information processing method that enables reduction of effort by the cook.

Note that the embodiment to be described below represents general or specific examples of the present disclosure. Numerical values, shapes, components, steps, the order of the steps, and the like that are described in the embodiment below are merely examples and do not limit the present disclosure. If a component that is not described in an independent claim corresponding to the highest level description of the present disclosure is described in the following embodiment, the component is described as an optional component.

Embodiment

1. Configuration of Information Processing Apparatus

Hereinafter, an embodiment in the disclosure will be described by using FIGS. 1 to 9.

FIG. 1 is a diagram illustrating an outline of an information processing apparatus 100 in this embodiment.

As illustrated in FIG. 1, the information processing apparatus 100 is installed in a system kitchen or the like. The information processing apparatus 100 is an apparatus that guides a cook on a preparation method, for example, how to cut an ingredient placed on a worktop (a place where a cutting board and a carrot are placed in FIG. 1). The information processing apparatus 100 is installed in a place farther than the worktop when viewed from, for example, a place where the cook stands (away from a viewer in FIG. 1). Note that the information processing apparatus 100 may be installed in a range hood or the like located to look out over the whole kitchen. The information processing apparatus 100 does not need to be built in the system kitchen, the range hood, or the like and may be separately installed as a separate unit.

The information processing apparatus 100 includes a camera 200 and a presenter 300.

The camera 200 is used to take an image of an ingredient or the cook on or near the worktop. The presenter 300 is a visual presentation unit such as a projector or a laser light source device that projects, on and near the worktop, an image for preparation assistance. FIG. 1 schematically illustrates a projection plane on the worktop. The projection plane is used by the presenter 300 to project an image. The presenter 300 projects the image generated based on data acquired by taking an image of an object on the worktop by the camera 200, and thereby the cook may be assisted in preparation.

Note that the information processing apparatus 100 does not need to include the camera 200 and the presenter 300. The camera 200 and the presenter 300 may be provided separately from the information processing apparatus 100.

The functional configuration of the information processing apparatus 100 will be described by using FIG. 2.

Figure 2:
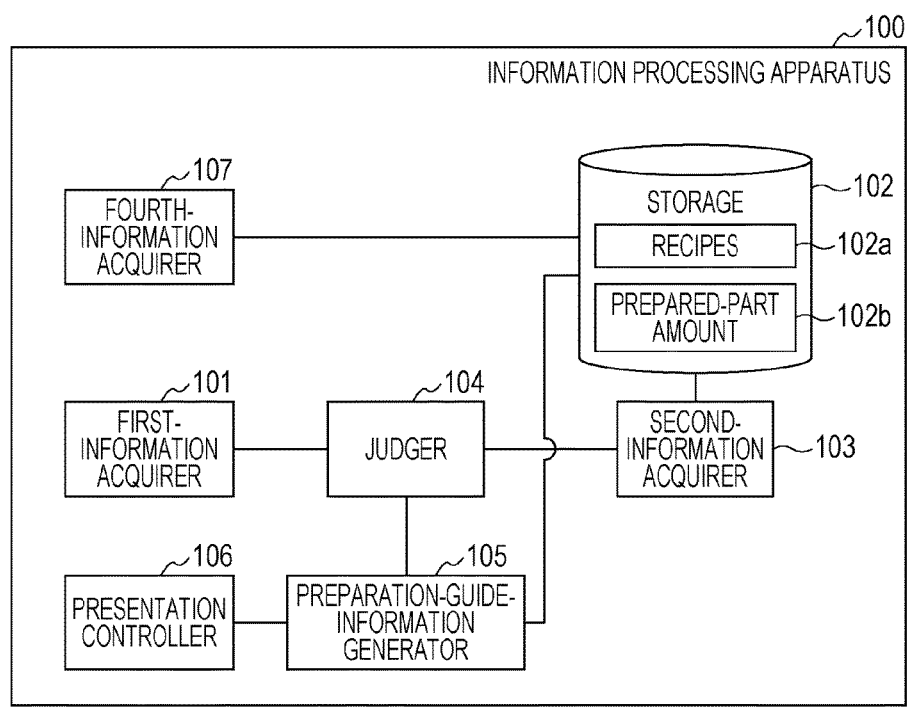
FIG. 2 is a diagram illustrating an example configuration of the information processing apparatus in this embodiment.

FIG. 2 is a diagram illustrating an example configuration of the information processing apparatus 100 in this embodiment.

As illustrated in FIG. 2, the information processing apparatus 100 includes, as functional components, a first-information acquirer 101, a second-information acquirer 103, a fourth-information acquirer 107, a judger 104, a preparation-guide-information generator 105, and a presentation controller 106. The information processing apparatus 100 also includes a storage 102. The information processing apparatus 100 includes, for example, a communication circuit (not illustrated in FIG. 2) and is capable of performing wired or wireless communication with an external server, a mobile terminal, and other apparatuses. The first-information acquirer 101, the second-information acquirer 103, the fourth-information acquirer 107, the judger 104, the preparation-guide-information generator 105, and the presentation controller 106 are implemented by a processor or the like that runs a program stored, for example, in the storage 102 and also may be implemented by a microcomputer, a dedicated circuit, or the like.

The first-information acquirer 101 acquires first information indicating the type of ingredient provided for preparation and the amount of the ingredient. The ingredient provided for preparation is provided by the cook or another person and placed within a range of image capturing to be performed by the camera 200. Hereinafter, an ingredient provided for preparation (an ingredient provided by a cook or another person) is simply referred to as an ingredient. For example, the camera 200 takes an image of the ingredient, and thereby the first-information acquirer 101 acquires the type of ingredient and the amount of the ingredient. This enables the type and the amount of the ingredient to be easily acquired by using the camera 200. Specifically, the first-information acquirer 101 recognizes the type of ingredient through image recognition and estimates the amount of the ingredient based on the area of the ingredient in the image. The first-information acquirer 101 thereby acquires the first information. For example, the weight of the ingredient serves as the amount of the ingredient. The first-information acquirer 101 estimates the weight of the ingredient based on the type of ingredient and the area of the ingredient in the image. Note that the size, the volume, or the like of the ingredient may serve as the amount of the ingredient.

The first-information acquirer 101 may acquire the type and the amount of the ingredient also by reading a one-dimensional bar code or a two-dimensional bar code. The one-dimensional or two-dimensional bar code is printed on a package of the ingredient, and an image thereof is captured by the camera 200*a*. Alternatively, the first-information acquirer 101 may acquire the type and the amount of the ingredient through image recognition to read characters representing the type and the amount of the ingredient. The characters are printed on the package, and an image thereof is captured by the camera 200. Further, the first-information acquirer 101 may acquire the amount of the ingredient with high accuracy based on information regarding a producing season, a producing area, or a producer. The information is printed on the package, and an image thereof is captured by the camera 200. For example, the moisture content of the ingredient varies with the producing season, the producing area, or the like, and the size of the ingredient varies with the producer. The first-information acquirer 101 may thus estimate the amount of the ingredient with higher accuracy than that of reading only the type and the amount of the ingredient.

The fourth-information acquirer 107 acquires fourth information indicating the amount of a prepared part of the provided ingredient. The fourth-information acquirer 107 recognizes an image of the prepared part of the ingredient captured by the camera 200, for example, through image recognition and thereby acquires the amount of the prepared part of the ingredient.

The storage 102 is a memory such as a read only memory (ROM) storing programs and data, a random access memory (RAM) used for storing data and the like when running a program, or another memory. The storage 102 stores therein recipes 102*a* and a prepared-part amount 102*b* (the amount of a prepared part).

The recipes 102*a* specify procedures needed for preparation. The recipes 102*a* each specify a preparation method including a needed amount that is needed for preparation of an ingredient, how to cut the ingredient (an ingredient cutting technique), and the like. Note that the recipes 102*a* may be stored in advance in the storage 102 included in the information processing apparatus 100 or may be acquired from a server via the Internet.

The prepared-part amount 102*b* is the fourth information acquired by the fourth-information acquirer 107 and updated with the progress of preparation (such as cutting) of the ingredient.

The second-information acquirer 103 acquires the amount of an ingredient of the type acquired by the first-information acquirer 101, an ingredient cutting technique, and the like that are needed in one of the recipes 102*a* stored, for example, in the storage 102. For example, if the type of ingredient acquired by the first-information acquirer 101 is identified as carrot, the second-information acquirer 103 acquires the amount of a carrot (such as information indicating one medium-size carrot) and a cutting technique for the carrot using a knife, such as cutting into round slices that are needed in the recipe 102*a*.

The judger 104 judges a magnitude relationship between an amount indicated by the first information acquired by the first-information acquirer 101 and an amount indicated by second information acquired by the second-information acquirer 103. Note that the magnitude relationship between the amount indicated by the first information and the amount indicated by the second information includes a relationship in which these amounts are equal to each other. The judger 104 calculates an amount for preparation of the ingredient in accordance with, for example, the judged magnitude relationship.

The preparation-guide-information generator 105 generates third information indicating the amount indicated by the second information versus the amount indicated by the first information in accordance with the magnitude relationship judged by the judger 104. The third information will be described in detail later.

The presentation controller 106 causes the presenter 300 to present the third information generated by the preparation-guide-information generator 105. For example, the presentation controller 106 causes the presenter 300 to superpose the third information on at least part of one of a provided ingredient, an image based on the provided ingredient, and a utensil on which the provided ingredient is placed. In addition, for example, the presentation controller 106 causes the presenter 300 to present the third information on a place outside the provided ingredient, more specifically, near the ingredient.

2. Operation of Information Processing Apparatus

Operation of the information processing apparatus 100 in this embodiment will be described in detail.

Figure 3:
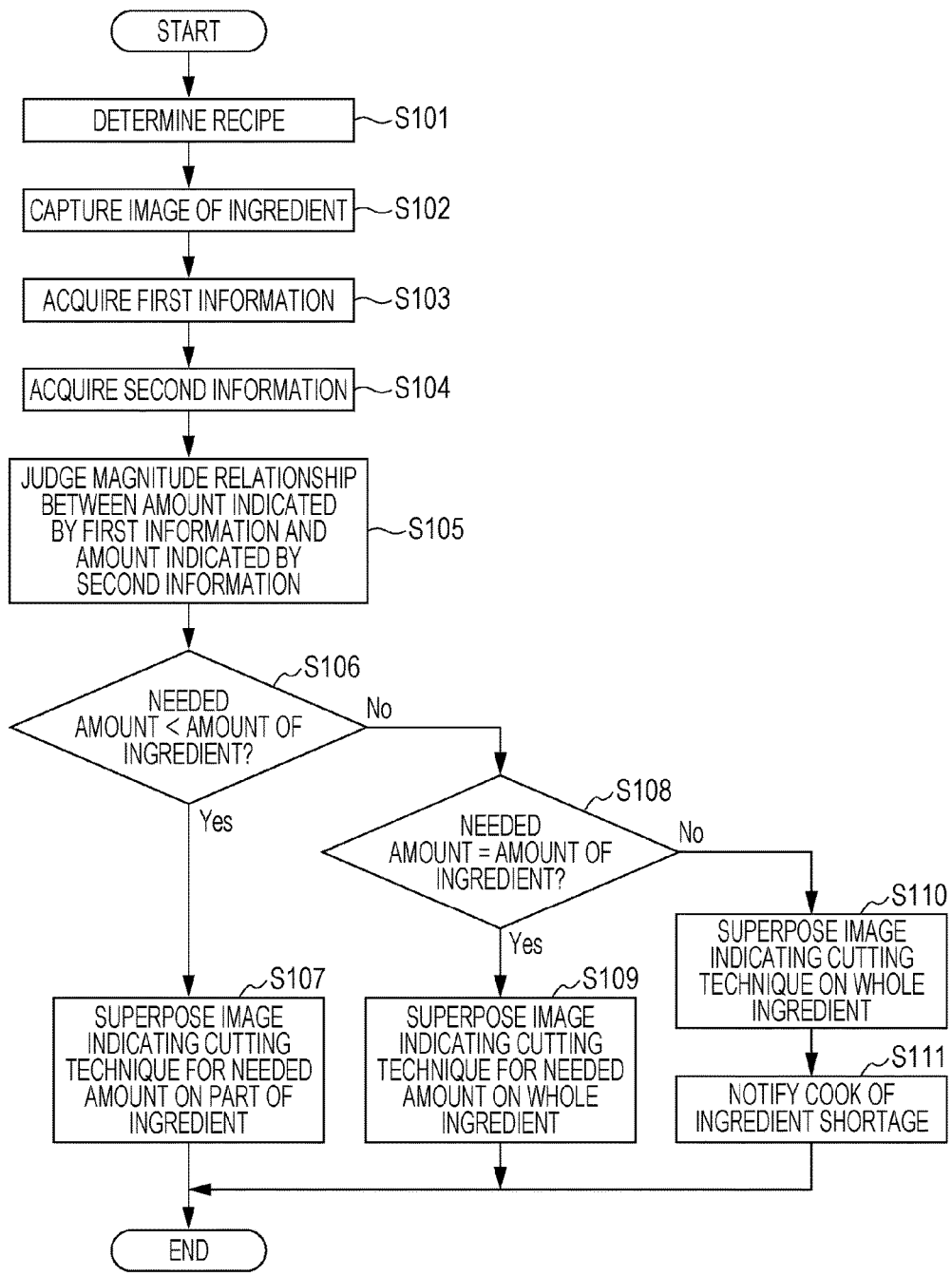
FIG. 3 is a flowchart illustrating an example of operation of the information processing apparatus in this embodiment.

FIG. 3 is a flowchart illustrating an example of the operation of the information processing apparatus 100 in this embodiment.

First, the second-information acquirer 103 determines a recipe for preparation to be performed by the cook among the recipes registered as the recipes 102a (step S101). For example, the second-information acquirer 103 may determine the recipe in response to a recipe input by the cook into an input unit of the information processing apparatus 100, a mobile terminal, or the like. In addition, for example, the presenter 300 projects an image representing a plurality of recipes on the worktop, and the cook holds a hand over a recipe for preparation to be performed among the projected recipes. Based on an image captured by the camera 200 and representing the cook holding a hand over a recipe, the fourth-information acquirer 107 judges a recipe among the projected recipes over which the cook holds a hand. This enables the second-information acquirer 103 to determine the recipe for preparation to be performed by the cook among the recipes registered as the recipes 102a. As described above, the second-information acquirer 103 may determine the recipe based on the gesture by the cook. In a case where a piece of an ingredient is attached to a hand of the cook, or where the hand is wet, the determination of a recipe may be performed without making the mobile terminal or the like dirty.

The camera 200 takes an image of the ingredient (step S102). Note that the camera 200 does not need to take an image of the ingredient itself. For example, the camera 200 may take an image of a one-dimensional bar code or a two-dimensional bar code on the package of the ingredient. The camera 200 may take an image of characters on the package of the ingredient provided for preparation.

The first-information acquirer 101 acquires the first information through ingredient image capturing performed by the camera 200 (step S103). For example, the first-information acquirer 101 estimates the type and the amount of the ingredient through image recognition of the image of the ingredient. Specifically, the first-information acquirer 101 acquires the type of ingredient based on the shape, the color, the pattern, and the like of the ingredient in the image captured by the camera 200 and estimates and acquires the amount of the ingredient based on the area of the ingredient in the image. Note that the first-information acquirer 101 may acquire the first information by reading the one-dimensional bar code or the two-dimensional bar code on the package of the ingredient. Specifically, if the two-dimensional bar code includes a uniform resource locator (URL), the first-information acquirer 101 acquires the first information via the Internet by using the URL. The first-information acquirer 101 may also acquire the first information by reading a type and an amount represented by characters on the package. If the acquired first information is such information that indicates "one large-size carrot", the first-information acquirer 101 estimates an amount (for example, a weight) corresponding to one large-size carrot. For example, the storage 102 may store in advance a table or the like having a relationship among the type of ingredient, a size thereof such as a large-size, a medium-size, and a small-size, and a weight thereof.

The second-information acquirer 103 acquires the second information indicating a needed amount in the recipe decided among the recipes registered as the recipes 102a and a preparation method for the ingredient (such as a cutting technique) (step S104). The needed amount is an amount needed for the ingredient of the type acquired by the first-information acquirer 101. For example, if the type acquired by the first-information acquirer 101 is identified as carrot, the second-information acquirer 103 acquires the needed amount of a carrot in the decided recipe and a cutting technique (such as cutting into round slices). If the recipe specifies one medium-size carrot as the needed amount of the carrot, the second-information acquirer 103 acquires an amount (for example, a weight) corresponding to one medium-size carrot in the same manner as that in the first-information acquirer 101.

The judger 104 judges a magnitude relationship between the amount indicated by the first information acquired by the first-information acquirer 101 and the amount indicated by the second information acquired by the second-information acquirer 103 (step S105). The judger 104 calculates an amount for preparation of the ingredient in accordance with the judged magnitude relationship. For example, the judger 104 judges the magnitude relationship between a weight indicated by the first information and a weight indicated by the second information.

A case where the judger 104 judges that the amount of the ingredient is larger than the needed amount (Yes in step S106) will be described by using FIG. 4.

For example, the first-information acquirer 101 acquires first information indicating an amount corresponding to one large-size carrot (250 g), and the second-information acquirer 103 acquires second information indicating a needed amount for a carrot corresponding to one medium-size carrot (150 g) and an ingredient cutting technique that is cutting into round slices. The judger 104 thereby judges that the amount of the ingredient is larger than the needed amount and calculates that an amount for preparation of the ingredient is, for example, 60% of the amount of one large-size carrot in accordance with the judged magnitude relationship.

In accordance with the magnitude relationship judged by the judger 104, the preparation-guide-information generator 105 generates the third information indicating the amount indicated by the second information versus the amount indicated by the first information. The third information is preparation guide information indicating, for example, an ingredient preparation method based on the amount for preparation calculated by the judger 104. The presentation controller 106 causes the presenter 300 to present the third information. Specifically, the presentation controller 106 causes the presenter 300 to present, as the third information, an image indicating the cutting technique for the needed amount in such a manner as to superpose the image on part of the ingredient (step S107). In this case, if the whole area of the ingredient is cut, the amount of the cut ingredient exceeds the needed amount. Accordingly, the image indicating the cutting technique is displayed in such a manner as to be superposed on only part of the ingredient.

Figure 4:
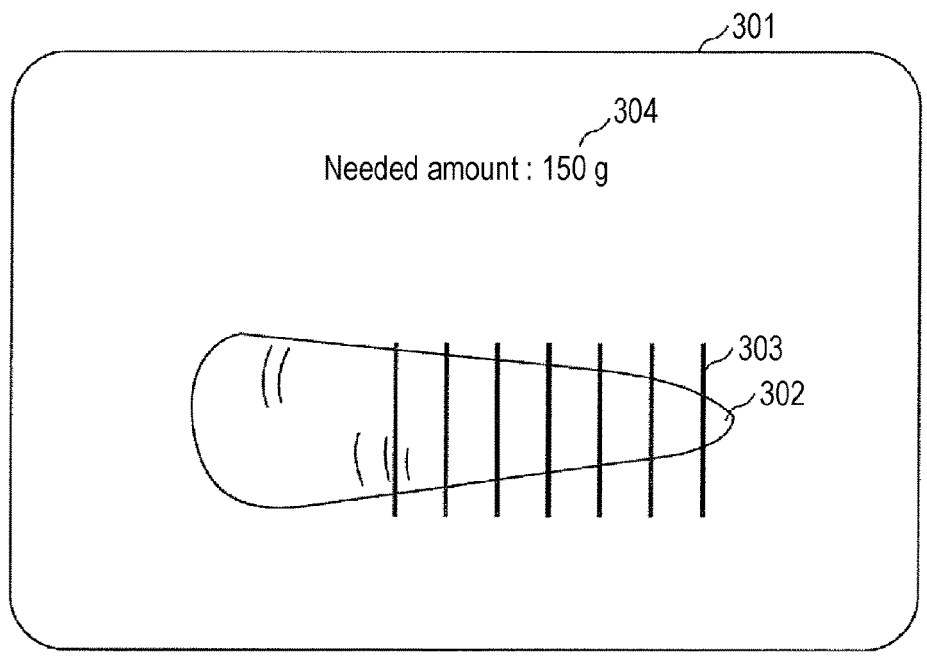
FIG. 4 is a diagram illustrating an example of third information displayed when the amount of an ingredient is larger than a needed amount.

FIG. 4 is a diagram illustrating an example of the third information displayed when the amount of an ingredient is larger than a needed amount. In FIG. 4, guide lines 303 are displayed as the third information in such a manner as to be superposed on part of the area of an ingredient (a carrot 302) placed on a cutting board 301. The guide lines 303 serve as an image for guiding the cook on a cutting technique that is cutting into round slices. As described above, if the judger 104 judges that the amount of the ingredient is larger than the needed amount, the preparation-guide-information generator 105 generates, as the third information, the image (for example, the guide lines 303 superposed on a 60% area of the ingredient area) that indicates the ingredient cutting technique and that is to be superposed on an area of a size corresponding to the amount for preparation in the whole area of the ingredient.

As described above, if the judger 104 judges that the amount indicated by the first information is larger than the amount indicated by the second information, the presentation controller 106 causes the presenter 300 to superpose the image indicating the ingredient cutting technique (guide lines 303) on an area of a size identified in the area of the provided ingredient (carrot 302) based on a difference between the amount indicated by the first information and the amount indicated by the second information.

At this time, the presentation controller 106 may cause the presenter 300 to present the second information. For example, FIG. 4 illustrates the second information that is a needed-amount message 304 and the third information (guide lines 303) that are displayed simultaneously. This enables the cook to simultaneously recognize the amount needed for the ingredient in the recipe and the amount for preparation of the ingredient provided for preparation and thus to easily recognize a prospective ingredient preparation process.

A case where the judger 104 judges that the amount of the ingredient is equal to the needed amount (No in step S106 and Yes in step S108) will be described by using FIG. 5.

For example, the first-information acquirer 101 acquires first information indicating an amount corresponding to one medium-size carrot (150 g), and the second-information acquirer 103 acquires the second information indicating the needed amount for a carrot corresponding to one medium-size carrot (150 g) and the ingredient cutting technique that is cutting into round slices. The judger 104 thereby judges that the amount of the ingredient is equal to the needed amount and calculates that an amount for preparation of the ingredient is, for example, 100% of the amount of one medium-size carrot in accordance with the judged magnitude relationship.

In accordance with the magnitude relationship judged by the judger 104, the preparation-guide-information generator 105 generates the third information indicating the amount indicated by the second information versus the amount indicated by the first information. The presentation controller 106 causes the presenter 300 to present the third information. Specifically, the presentation controller 106 causes the presenter 300 to display, as the third information, an image indicating the cutting technique for the needed amount in such a manner as to superpose the image on the whole area of the ingredient (step S109). In this case, if the whole area of the ingredient is cut, the amount of the cut ingredient corresponds to the needed amount. Accordingly, the image indicating the cutting technique is displayed in such a manner as to be superposed on the whole area of the ingredient.

Figure 5:
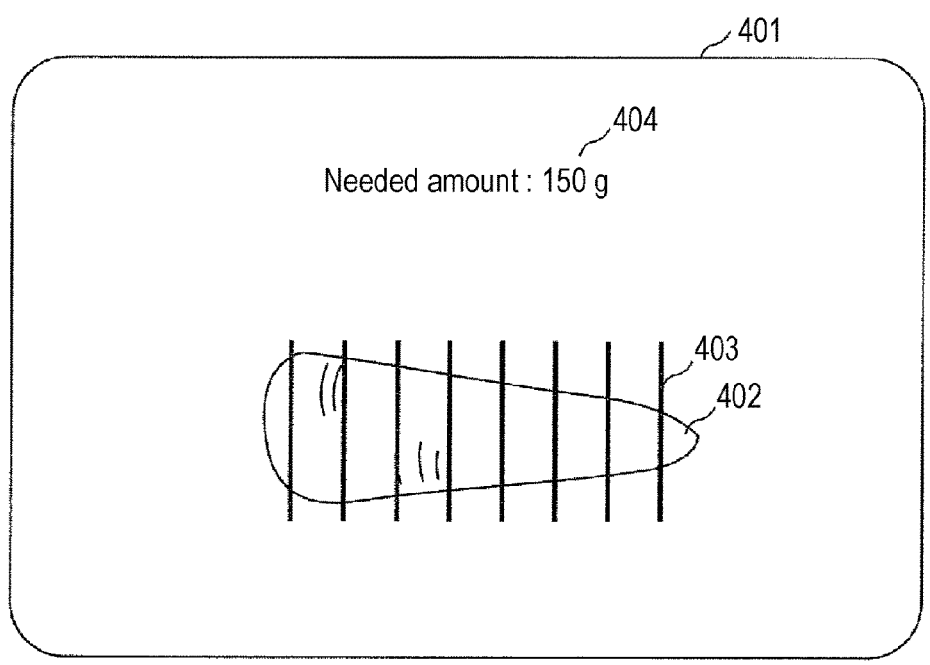
FIG. 5 is a diagram illustrating an example of the third information displayed when the amount of an ingredient is equal to a needed amount.

FIG. 5 is a diagram illustrating an example of the third information displayed when the amount of an ingredient is equal to a needed amount. In FIG. 5, guide lines 403 serving as an image for guiding the cook on a cutting technique that is cutting into round slices are displayed as the third information in such a manner as to be superposed on the whole area of an ingredient (a carrot 402) placed on a cutting board 401. As described above, if the judger 104 judges that the amount of the ingredient is equal to the needed amount, the preparation-guide-information generator 105 generates, as the third information, the image (for example, the guide lines 403 to be superposed on the whole ingredient area) that indicates the ingredient cutting technique and that is to be superposed on the whole ingredient area. Like FIG. 4 illustrating the needed-amount message 304, FIG. 5 illustrates a needed-amount message 404 (second information) serving as information indicating the needed amount.

As described above, if the judger 104 judges that the amount indicated by the first information is equal to the amount indicated by the second information, the presentation controller 106 causes the presenter 300 to superpose the image indicating the ingredient cutting technique (guide lines 403) on the whole area of the provided ingredient (carrot 402).

A case where the judger 104 judges that the amount of the ingredient is smaller than the needed amount (No in steps S106 and S108) will be described by using FIG. 6.

For example, the first-information acquirer 101 acquires first information indicating an amount corresponding to one small-size carrot (75 g), and the second-information acquirer 103 acquires the second information indicating the needed amount for a carrot corresponding to one medium-size carrot (150 g) and the ingredient cutting technique that is cutting into round slices. The judger 104 thereby judges that the amount of the ingredient is smaller than the needed amount and calculates that an amount for preparation of the ingredient is, for example, 200% of the amount of one small-size carrot (two small-size carrots) in accordance with the judged magnitude relationship.

In accordance with the magnitude relationship judged by the judger 104, the preparation-guide-information generator 105 generates the third information indicating the amount indicated by the second information versus the amount indicated by the first information. The presentation controller 106 causes the presenter 300 to present the third information. Specifically, the presentation controller 106 causes the presenter 300 to display, as the third information, an image indicating the cutting technique in such a manner as to superpose the image on the whole area of the ingredient (step S110). However, the use of only the amount indicated by the first information acquired by the first-information acquirer 101 is insufficient for the amount indicated by the second information. Accordingly, the preparation-guide-information generator 105 generates information indicating shortage of the amount of the ingredient, and the presentation controller 106 notifies the cook of the ingredient shortage (step S111).

Figure 6:
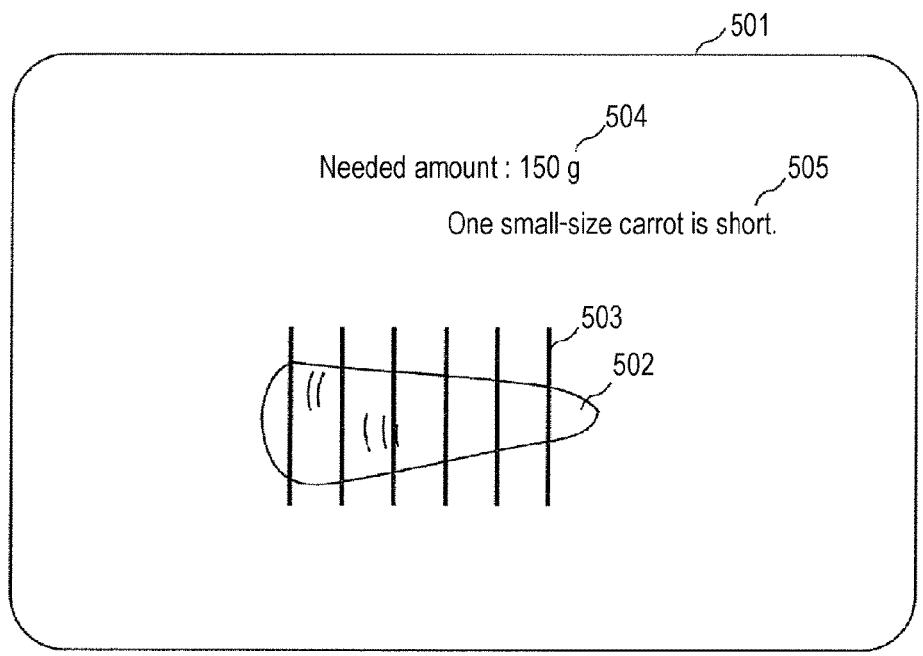
FIG. 6 is a diagram illustrating an example of the third information displayed when the amount of an ingredient is smaller than a needed amount.

FIG. 6 is a diagram illustrating an example of the third information displayed when the amount of an ingredient is smaller than a needed amount. In FIG. 6, guide lines 503 serving as an image for guiding the cook on a cutting technique that is cutting into round slices are displayed as the third information in such a manner as to be superposed on the whole area of an ingredient (a carrot 502) placed on a cutting board 501. As described above, if the judger 104 judges that the amount of the ingredient is smaller than the needed amount, the preparation-guide-information generator 105 generates, as the third information, the image (for example, the guide lines 503 to be superposed on the whole ingredient area) that indicates the ingredient cutting technique and that is to be superposed on the whole ingredient area. Since the use of only the ingredient (carrot 502) is insufficient for the needed amount, the preparation-guide-information generator 105 also generates an additional-preparation message 505 "One small-size carrot is short." as information indicating ingredient shortage. This enables the cook to recognize that an ingredient needs to be prepared additionally. Note that the information indicating ingredient shortage may be presented after an ingredient to be used for preparation undergoes the preparation. Like FIG. 4 illustrating the needed-amount message 304, FIG. 6 illustrates a needed-amount message 504 as the second information.

As described above, if the judger 104 judges that the amount indicated by the first information is smaller than the amount indicated by the second information, the presentation controller 106 causes the presenter 300 to superpose the image indicating the ingredient cutting technique (guide lines 503) on the whole area of the provided ingredient (carrot 502) and causes the presenter 300 to present the information indicating ingredient shortage (additional-preparation message 505) outside, more specifically, near the provided ingredient.

Note that the magnitude relationship between the amount of the ingredient and the needed amount is judged in step S105 but is not necessarily strictly judged like, for example, the magnitude relationship between weights calculated through estimation.

The presentation controller 106 may further cause the presenter 300 to present fifth information indicating the progress of preparation based on the second information and the fourth information acquired by the fourth-information acquirer 107.

Figure 7:
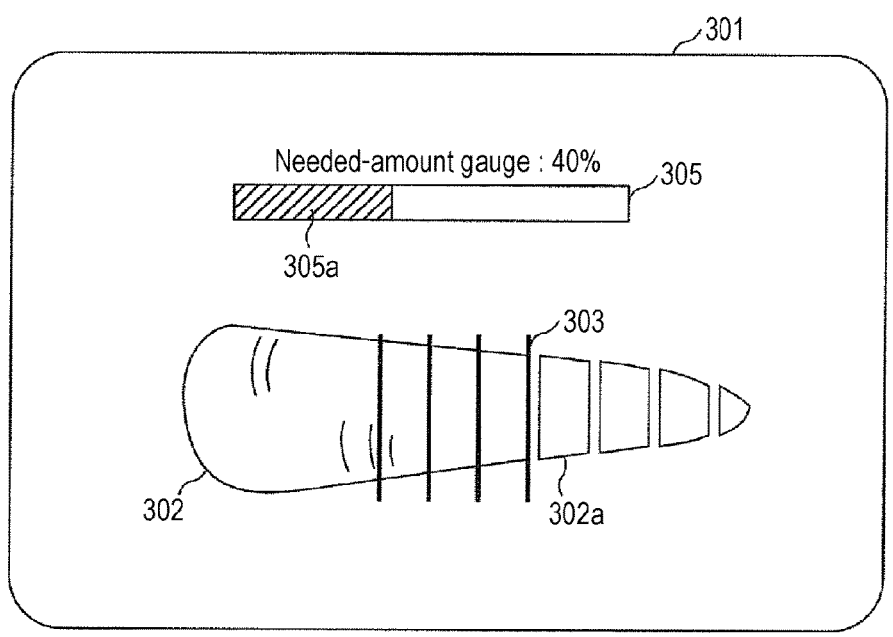
FIG. 7 is a diagram for explaining fifth information.

FIG. 7 is a diagram for explaining the fifth information. FIG. 7 illustrates an example of presentation caused by the presentation controller 106 when the amount of an ingredient is larger than a needed amount. For example, FIG. 7 illustrates a needed-amount gauge 305 and a prepared-part-amount gauge 305a that are simultaneously displayed as the fifth information. Since the camera 200 has captured an image of the ingredient being prepared, the fourth-information acquirer 107 acquires the amount of a prepared part (a cut carrot 302a) of the ingredient through image recognition and updates the prepared-part amount 102b stored in the storage 102 with the progress of the preparation. The preparation-guide-information generator 105 generates, as the fifth information, the prepared-part-amount gauge 305a that varies in the needed-amount gauge 305 in accordance with the prepared-part amount 102b. The presentation controller 106 thereby causes the prepared-part-amount gauge 305a to be displayed in such a manner that the area of the needed-amount gauge 305 is increased with the increase of the prepared-part amount 102b stored in the storage 102. For example, in a state where the carrot 302 has not been cut yet, the prepared-part-amount gauge 305a is not displayed in the needed-amount gauge 305. With the progress of the cook's cutting the carrot 302 along the guide lines 303, the area of the prepared-part-amount gauge 305a is increased in the needed-amount gauge 305. When the last cutting is performed in the area on which the guide lines 303 on the carrot 302 have been superposed, the needed-amount gauge 305 is filled with the prepared-part-amount gauge 305a.

The amount needed for the ingredient in the recipe and the amount of the part that has been prepared in the ingredient are thereby made visible. This enables the cook to simultaneously recognize these amounts and thus to easily recognize the progress of the ingredient preparation.

Note that in the state where the carrot 302 has not been cut yet, the needed-amount gauge 305 may be filled with the prepared-part-amount gauge 305a. With the progress of the cook's cutting the carrot 302 along the guide lines 303, the area of the prepared-part-amount gauge 305a may be decreased in the needed-amount gauge 305. When the last cutting is performed in the area on which the guide lines 303 on the carrot 302 have been superposed, the prepared-part-amount gauge 305a may disappear in the needed-amount gauge 305. Specifically, with the increase of the prepared-part amount 102b, the area of the prepared-part-amount gauge 305a may be increased or decreased.

While a difference between the amount indicated by the second information acquired by the second-information acquirer 103 and the amount indicated by the fourth information acquired by the fourth-information acquirer 107 (prepared-part amount 102b) is equal to or smaller than a predetermined value, the presentation controller 106 may cause the presenter 300 to present information indicating that the end of preparation is approaching.

Figure 8:
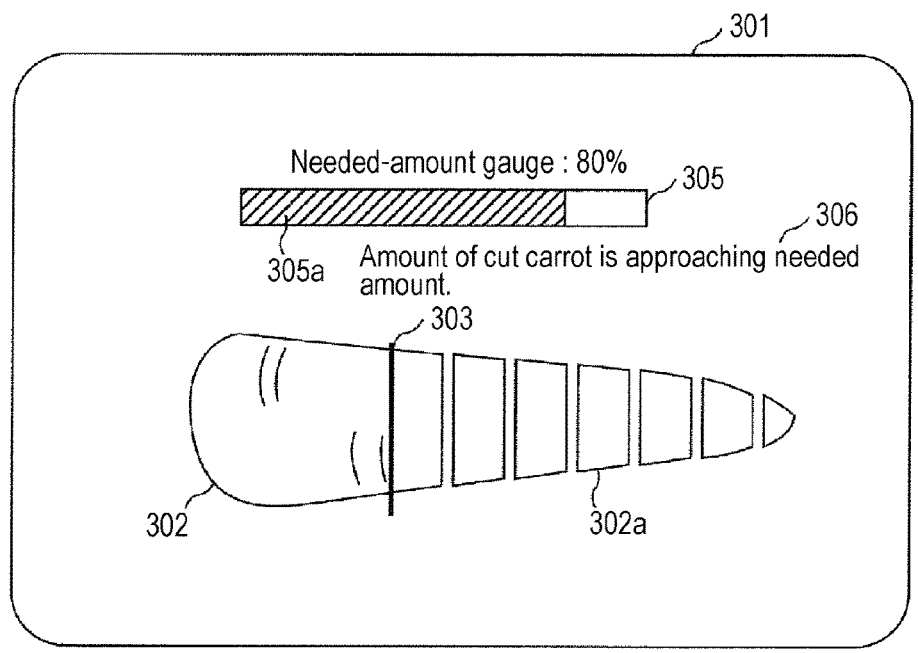
FIG. 8 is a diagram for explaining information indicating that the end of preparation is approaching.

FIG. 8 is a diagram for explaining information indicating that the end of preparation is approaching. FIG. 8 illustrates an example of presentation caused by the presentation controller 106 when the amount of the ingredient is larger than the needed amount. When the difference between the needed amount and the prepared-part amount 102b is equal to or smaller than the predetermined value (for example, 20%), the preparation-guide-information generator 105 generates, as the information indicating that the end of preparation is approaching, a preparation-end approaching message 306 "Amount of cut carrot is approaching needed amount." as illustrated in FIG. 8. The presentation controller 106 causes the presenter 300 to present the preparation-end approaching message 306.

This enables the cook to be notified of the approach of the amount of the part that has been prepared in the ingredient to the amount needed for the ingredient in the recipe and thus to easily perform preparation of the ingredient provided for preparation in accordance with the needed amount. Note that the predetermined value is not limited to 20% and may be another value.

Note that the case where the amount of the ingredient is larger than the needed amount has heretofore been described as an example with reference to FIGS. 7 and 8. The same operations are performed in the cases where the amount of the ingredient is equal to the needed amount and where the amount is smaller than the needed amount, and thus description thereof is omitted.

As described above, the magnitude relationship between the amount needed for the ingredient in the recipe and the amount of the ingredient provided for preparation is judged, and the amount needed for the ingredient in the recipe versus the amount of the actually provided ingredient is presented. Accordingly, even if the amount of an ingredient different from an amount needed for the ingredient in a recipe is provided, the cook does not need to determine an amount for preparation of the actually provided ingredient by themselves, and effort by the cook may be reduced.

In addition, as described in the embodiment, the third information may include the information indicating the cutting technique for the provided ingredient. The information is based on the amount needed for the ingredient versus the amount of the provided ingredient. Even if the amount of an ingredient different from an amount needed for the ingredient in a recipe is provided, the cook does not need to determine an amount for cutting the actually provided ingredient by themselves, and the effort by the cook may be reduced. For example, an image indicating an ingredient cutting technique and generated in accordance with a magnitude relationship between the amount of the ingredient and an amount needed for the ingredient in a recipe is superposed on the ingredient. Accordingly, simply cutting the ingredient in accordance with the superposed image enables the cook to easily provide the amount needed for the ingredient in the recipe.

Other Embodiments

The information processing apparatus 100 in the present disclosure has been described based on the embodiment. However, the disclosure is not limited to the embodiment. Various modifications conceived by those skilled in the art that are made to the embodiment and combinations of components in different embodiments are included in the present disclosure without departing from the spirit of the present disclosure.

For example, in the above-described embodiment, the first-information acquirer 101 acquires the first information by using the camera 200, but the acquisition is not limited to this. For example, the first-information acquirer 101 may acquire the first information in such a manner that the cook inputs the type and the amount of an ingredient by using the input unit of the information processing apparatus 100 or the mobile terminal. A weight sensor capable of detecting the weight of an ingredient placed on the worktop or the cutting board may be provided, and thereby the weight of the ingredient may be detected.

The visual presentation unit such as a projector or a laser light source device is taken as an example of the presenter 300 in the description; however, the presenter 300 is not limited to these devices. For example, a monitor may be used as the presenter 300. In this case, for example, the presentation controller 106 may cause the third information to be superposed on an image (a captured image of a provided ingredient) that is based on the provided ingredient and that is displayed on the monitor corresponding to the presenter 300 installed in a place where the cook is able to view the image when performing preparation of the ingredient. For example, if the ingredient and the presenter 300 are located as illustrated in FIG. 1, an image (third information) projected by the presenter 300 is displayed on only part of the ingredient that is closer to the presenter 300 than the other part in some cases and thus is not a whole image of the ingredient. The cook does not recognize the image superposed on the ingredient easily. However, the monitor is capable of displaying the whole image, and thus the cook easily recognizes an image superposed on the image based on the provided ingredient. In addition, for example, the presentation controller 106 may cause a speaker that performs audio presentation to perform audio guidance on the information.

Moreover, for example, in the above-described embodiment, the first-information acquirer 101, the fourth-information acquirer 107, and the presentation controller 106 are each the functional component of the information processing apparatus 100. However, the configuration is not limited to this. For example, the first-information acquirer 101 and the fourth-information acquirer 107 may be the camera 200, and the presentation controller 106 may be the presenter 300.

Further, for example, cutting into round slices has been described as an example of the cutting technique in the above-described embodiment. For example, in a case where an ingredient is to be chopped up, oblique guide lines may be superposed on the ingredient, and a message "Turn ingredient." may be presented.

Still further, for example, a preparation method has been described focusing on the ingredient cutting technique in the above-described embodiment; however, a preparation method to which the disclosure is applicable is not limited to the ingredient cutting technique. For example, a preparation method may be a boiling technique (such as when to boil) or the like for an ingredient. Operation performed by the information processing apparatus 100 in a case of, for example green beans used as an ingredient will be described.

First, the first-information acquirer 101 acquires first information. For example, the first-information acquirer 101 acquires information indicating green beans as the type of ingredient and indicating the amount of the green beans corresponding to large-size pods of green beans. The second-information acquirer 103 then acquires second information indicating an amount needed for the green beans in a recipe. For example, the second-information acquirer 103 acquires information indicating that the needed amount corresponds to five medium-size pods of green beans. Subsequently, the judger 104 judges a magnitude relationship between the amount of the green beans (large-size pods of green beans) acquired by the first-information acquirer 101 and the needed amount of the green beans (five medium-size pods of green beans) in the recipe acquired by the second-information acquirer 103 and calculates an amount for preparation of the green beans in accordance with the judged magnitude relationship. For example, the judger 104 calculates that an amount for preparation is four large-size pods of green beans. The preparation-guide-information generator 105 generates the third information based on the amount for preparation calculated by the judger 104, and the presentation controller 106 causes the third information to be presented. For example, the presentation controller 106 causes a message "Boil four pods of green beans." to be presented as the third information. As described above, the preparation method in the disclosure is not limited to the cutting technique, and the disclosure is also applicable to other preparation methods.

The state of an ingredient is not limited to a solid state. For example, a liquid or gel ingredient may be used. In addition, preparation guide information may be presented on a container containing the liquid or gel ingredient. A case where operations performed by the information processing apparatus 100 in a case of a liquid ingredient used as an ingredient will be described with reference to FIG. 9.

Figure 9:
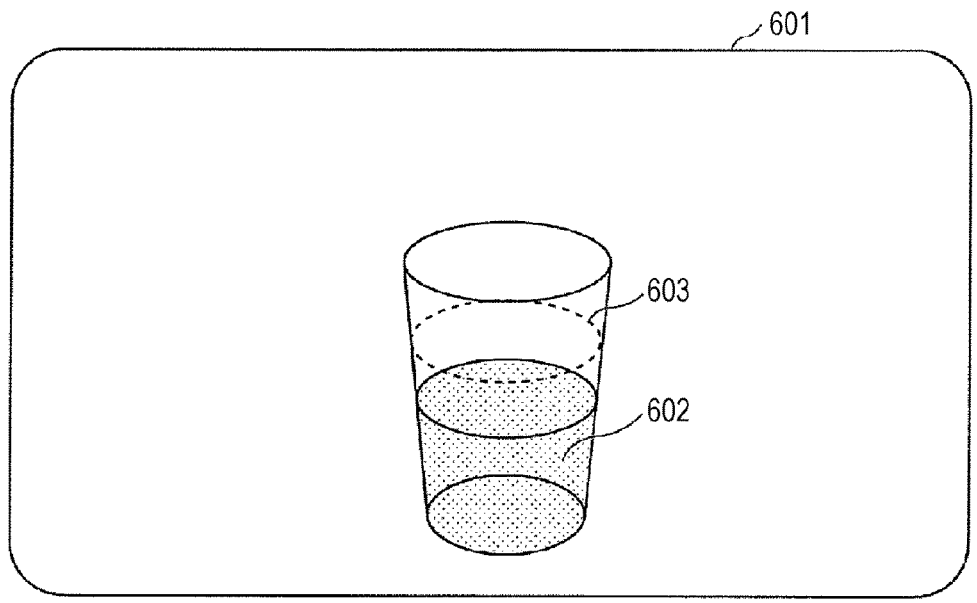
FIG. 9 is a diagram illustrating an example of the third information displayed when the amount of a liquid ingredient is smaller than the needed amount.

First, the first-information acquirer 101 acquires first information. For example, the first-information acquirer 101 acquires information indicating milk as the type of ingredient and indicating the amount of the milk corresponding to 200 ml. The second-information acquirer 103 then acquires the second information indicating an amount needed for the milk in a recipe. For example, the second-information acquirer 103 acquires information indicating that the needed amount is 300 ml. Subsequently, the judger 104 judges a magnitude relationship between the amount of the milk (200 ml) acquired by the first-information acquirer 101 and the needed amount of the milk (300 ml) in the recipe acquired by the second-information acquirer 103 and calculates an amount for preparation of the milk in accordance with the judged magnitude relationship. For example, the judger 104 calculates that the amount for preparation is 200 ml and that a shortage amount is 100 ml. The preparation-guide-information generator 105 generates the third information based on the amount for preparation and the shortage amount that are calculated by the judger 104. The presentation controller 106 causes the third information to be presented. For example, as illustrated in FIG. 9, the presentation controller 106 causes a line image 603 representing an amount that is short in preparation with respect to the amount of provided milk 602 to be superposed on a container placed on a worktop 601. Note that a message such as "100 ml short", "Fill milk up to three fourths of glass", or "Increase amount of milk in glass by 1.5 times" based on the shortage amount may be presented. As described above, the information processing apparatus 100 is applicable to not only a solid ingredient but also ingredients in other states.

The example in which an ingredient is placed on the cutting board has been described; however, the place where the ingredient is placed is not limited to the cutting board. The preparation guide information may be presented on an ingredient placed on a cooking utensil such as an induction heating (IH) cooking heater, a gas range, or a microwave oven.

Instead of or in addition to the needed-amount gauge 305 and the prepared-part-amount gauge 305a that are described with reference to FIG. 7, a gauge indicating a needed amount versus the amount of the provided ingredient may be presented. Specifically, the needed-amount gage and an ingredient-amount gauge indicating the amount of the provided ingredient are displayed. For example, in the case where the amount of the provided ingredient is larger than the needed amount as illustrated in FIG. 4, the ingredient-amount gauge and the needed-amount gage are displayed in such a manner that the ingredient-amount gauge exceeds the needed-amount gage. In the case where the amount of the provided ingredient is equal to the needed amount as illustrated in FIG. 5, the ingredient-amount gauge and the needed-amount gage are displayed in such a manner that the ingredient-amount gauge and the needed-amount gage match. In the case where the amount of the provided ingredient is smaller than the needed amount as illustrated in FIG. 6, the ingredient-amount gauge and the needed-amount gage are displayed in such a manner that the needed-amount gage falls below the ingredient-amount gauge.

The information processing apparatus 100 may be implemented as a server apparatus. A client-server system may be configured by the server apparatus and client apparatuses implemented as the camera 200, the presenter 300, and other apparatuses.

The disclosure may be implemented as not only the information processing apparatus 100 but also a method including steps (processing) performed by the components of the information processing apparatus 100.

For example, these steps may be performed by a computer (computer system). The disclosure may be implemented as a program for causing the computer to perform the steps included in the method. Further, the disclosure may be implemented as a non-transitory computer readable recording medium such as a compact disc (CD)-ROM.

For example, in a case where the disclosure is implemented as the program (software), the steps are performed by running the program by using hardware resources such as a central processing unit (CPU), a memory, and an input-output circuit of the computer. Specifically, the steps are performed in such a manner that the CPU acquires data from the memory, the input-output circuit, or the like, performs computation on the data, and outputs a computation result to the memory, the input-output circuit, or the like.

The plurality of components of the information processing apparatus 100 in the above-described embodiment may be implemented as a dedicated or general-purpose circuit. These components may each be implemented as one circuit or a plurality of circuits.

The plurality of components of the information processing apparatus 100 in the above-described embodiment may be implemented as a large scale integration (LSI) that is an integrated circuit (IC). These components may be implemented as respective chips or may be partially or entirely integrated into one chip. The LSI is referred to as a system LSI, a super LSI, or an ultra LSI in some cases depending on the degree of integration.

The integrated circuit is not limited to the LSI and may be implemented by a dedicated circuit or a general-purpose processor. A field programmable gate array (FPGA) that is programmable or a reconfigurable processor that allows reconfiguration of the connection and setup of circuit cells inside the LSI may be used.

Various modifications conceived by those skilled in the art that are made to the embodiment and combinations of the components optionally performed in the embodiment without departing from the spirit of the present disclosure may also be included in the present disclosure.

The present disclosure is useful as an information processing apparatus that enables reduction of effort by a cook.

What is claimed is:

1. An information processing apparatus, comprising:
a processor; and
a memory that stores a program that, when executed by the processor, causes the processor to execute operations, including
acquiring first information indicating a type of an ingredient provided for preparation and an amount of the provided ingredient, wherein the provided ingredient is placed on a worktop, and wherein the first information is acquired from an image of the provided ingredient, which is captured by a camera;
acquiring second information indicating an amount that is needed for an ingredient in a recipe, wherein a type of the ingredient to be needed in the recipe is the same as the type of the provided ingredient;
judging a magnitude relationship between the amount indicated by the first information and the amount indicated by the second information;
controlling a presenter to visually present, on a projection plane on the worktop, third information indicating, in accordance with the judged magnitude relationship, the amount indicated by the second information versus the amount indicated by the first information acquired from the image captured by the camera, wherein the provided ingredient is in the projection plane; and
controlling the presenter to visually present information indicating an ingredient cutting technique for the provided ingredient on the provided ingredient, which is in the projection plane,
wherein when it is judged that the amount indicated by the first information is smaller than the amount indicated by the second information, the program causes the processor to execute presenting, as the third information, information indicating an ingredient shortage in a first area in the projection plane, and the first area is an area outside the of the provided ingredient.

2. The information processing apparatus according to claim 1,
wherein the program causes the processor to execute presenting the information indicating the ingredient cutting technique by superimposing an image indicating the ingredient cutting technique on the provided ingredient.

3. The information processing apparatus according to claim 1,
wherein the information, indicating the ingredient cutting technique, is information based on the amount of the ingredient to be needed in the recipe, versus the amount of the provided ingredient.

4. The information processing apparatus according to claim 1,
wherein the program causes the processor to execute controlling the presenter to present the second information on the first area.

5. The information processing apparatus according to claim 1, the program further causes the processor to execute:
acquiring fourth information indicating an amount of a prepared part of the provided ingredient; and
controlling the presenter to visually present, on the first area, fifth information indicating progress of the preparation based on the second information and the acquired fourth information.

6. The information processing apparatus according to claim 5,
wherein while a difference between the amount indicated by the second information and the amount indicated by the fourth information is equal to or smaller than a predetermined value, the program further causes the processor to execute controlling the presenter to visually present, on the first area, information indicating that an end of the preparation is approaching.

7. The information processing apparatus according to claim 3,
wherein when it is judged that the amount indicated by the first information is larger than the amount indicated by the second information, the program causes the processor to execute controlling the presenter to visually present information indicating the ingredient cutting technique by superimposing an image indicating the ingredient cutting technique on a second area of a size identified based on a difference between the amount indicated by the first information and the amount indicated by the second information, the second area being in at least a part of a surface of the provided ingredient, which is in the projection plane.

8. The information processing apparatus according to claim 3,
wherein when it is judged that the amount indicated by the first information is equal to the amount indicated by the second information, the program causes the processor to execute controlling the presenter to visually present the information indicating the ingredient cutting technique by superimposing an image indicating the ingredient cutting technique on a surface of the provided ingredient, which is in the projection plane.

9. The information processing apparatus according to claim 3,
wherein when it is judged that the amount indicated by the first information is smaller than the amount indicated by the second information, the program causes the processor to execute controlling the presenter to visually present the information indicating the ingredient cutting technique by superimposing an image indicating the ingredient cutting technique on a surface of the provided ingredient.

10. An information processing method, comprising:
acquiring, using a processor, first information indicating a type of an ingredient provided for preparation and an amount of the provided ingredient, wherein the provided ingredient is placed on a worktop, and wherein the first information is acquired from an image of the provided ingredient, which is captured by a camera;
acquiring, using the processor, second information indicating an amount that is needed for an ingredient of the type in a recipe;
judging, using the processor, a magnitude relationship between the amount indicated by the first information and the amount indicated by the second information; and
controlling, using the processor, a presenter to visually present, on a projection plane on the worktop, third information indicating, in accordance with the judged magnitude relationship, the amount indicated by the second information, versus the amount indicated by the first information acquired from the image captured by the camera, wherein the provided ingredient is in the projection plane; and
controlling the presenter to visually present information indicating an ingredient cutting technique for the provided ingredient on the provided ingredient, which is in the projection plane,
wherein when it is judged that the amount indicated by the first information is smaller than the amount indicated by the second information, the program causes the processor to execute presenting, as the third information, information indicating an ingredient shortage in a first area in the projection plane, and the first area is an area outside the of the provided ingredient.

* * * * *